US011065542B2

(12) United States Patent
Andall et al.

(10) Patent No.: US 11,065,542 B2
(45) Date of Patent: Jul. 20, 2021

(54) METHOD AND APPARATUS FOR DETERMINING USER ENGAGEMENT IN A VIDEOGAME

(71) Applicant: Sony Interactive Entertainment Inc., Tokyo (JP)

(72) Inventors: Hogarth Andall, London (GB); Oliver Hume, London (GB)

(73) Assignee: Sony Interactive Entertainment Inc., Tokyo (JP)

(*) Notice: Subject to any disclaimer, the term of this patent is extended or adjusted under 35 U.S.C. 154(b) by 0 days.

(21) Appl. No.: 16/701,730

(22) Filed: Dec. 3, 2019

(65) Prior Publication Data

US 2020/0179806 A1 Jun. 11, 2020

(30) Foreign Application Priority Data

Dec. 6, 2018 (GB) .................................... 1819917

(51) Int. Cl.
*A63F 13/537* (2014.01)
*A63F 13/35* (2014.01)

(52) U.S. Cl.
CPC ............ *A63F 13/537* (2014.09); *A63F 13/35* (2014.09)

(58) Field of Classification Search
CPC ................................ A63F 13/35; A63F 13/537
See application file for complete search history.

(56) References Cited

U.S. PATENT DOCUMENTS

| 8,060,460 | B2* | 11/2011 | Tzruya | G06Q 30/0251 706/62 |
| 2012/0264511 | A1* | 10/2012 | Marsland | A63F 13/61 463/31 |
| 2012/0278179 | A1* | 11/2012 | Campbell | G06Q 30/0255 705/14.69 |
| 2014/0057700 | A1* | 2/2014 | Czubak | G07F 17/3244 463/25 |
| 2014/0180972 | A1* | 6/2014 | Boldyrev | G06T 19/006 706/12 |
| 2015/0312421 | A1* | 10/2015 | Leemet | H04W 4/70 379/114.03 |

(Continued)

FOREIGN PATENT DOCUMENTS

EP 3300780 A1 4/2018

OTHER PUBLICATIONS

Combined Search and Examination Report for corresponding GB Application No. 1819917.4, 4 pages, dated Jun. 3, 2019.

(Continued)

Primary Examiner — Steve Rowland
(74) Attorney, Agent, or Firm — Matthew B. Dernier, Esq.

(57) ABSTRACT

A method of determining user engagement in a game includes: receiving data from a plurality of remote entertainment devices at a server, the data from a respective entertainment device associating at least a first feature state of the game with an action by a user of that respective entertainment device indicative of a predetermined degree of engagement by the user with the game, aggregating the data received from the plurality of entertainment devices, and determining a level of correspondence between one or more feature states and user actions indicative of the predetermined degree of engagement.

9 Claims, 3 Drawing Sheets

(56) References Cited

U.S. PATENT DOCUMENTS

| | | | |
|---|---|---|---|
| 2015/0312422 A1* | 10/2015 | Leemet | H04M 15/44 |
| | | | 455/406 |
| 2016/0001181 A1 | 1/2016 | Marr | |
| 2016/0267520 A1* | 9/2016 | Kalish | G06Q 30/0272 |
| 2017/0171620 A1* | 6/2017 | Oren | H04N 21/44222 |
| 2017/0259177 A1* | 9/2017 | Aghdaie | G06N 7/005 |
| 2017/0259178 A1 | 9/2017 | Aghdaie | |
| 2018/0189825 A1* | 7/2018 | Lin | G06Q 30/0246 |
| 2018/0276543 A1* | 9/2018 | Parrotta, Jr. | G06F 3/04847 |
| 2019/0163259 A1* | 5/2019 | Baughman | G06T 13/80 |

OTHER PUBLICATIONS

Extended European Search Report for corresponding EP Application No. 19208018, 10 pages, dated Jan. 13, 2020.

Anders Drachen et al: "Analyzing spatial user behavior in computer games using geographic information systems" Proceedings of the 13th International Mindtrek Conference: Everyday Life in the Ubiquitous Era on Mindtrek, pp. 182-189, Jan. 1, 2009.

Jun H Kim et al: "Tracking real-time user experience (TRUE)", The 26th Annual CHI Conference on Human Factors in Computing Systems. CHI 2008, Conference Proceedings; Apr. 5-10, 2008 in Florence. Italy. ACM. New York. NY, USA, pp. 443-451, Apr. 6, 2008.

\* cited by examiner

METHOD AND APPARATUS FOR DETERMINING USER ENGAGEMENT IN A VIDEOGAME

BACKGROUND OF THE INVENTION

Field of the Invention

Description of the Prior Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

The present invention relates to a method and apparatus for determining user engagement in a videogame.

Videogame developers aim to provide an engaging and entertaining experience with their games. However, it will also be appreciated that, particularly in large and so-called open world games, content needs to be spaced apart in order to provide a sense of scale, coherent progression, feasibility for the user, as well as storytelling and tone. Content may also be spaced apart to meet constraints on development resources.

As such, some videogames represent a trade-off between richness of environment, user engagement, and developer resources.

However, it can be difficult for a developer to manage this trade-off, particularly in a complex multivariate game when different character classes may exist, different quests may be followed by users with different priorities, and players may encounter parts of the environment with different in-game capabilities and agendas.

The present invention aims to mitigate or alleviate this problem.

SUMMARY OF THE INVENTION

The foregoing paragraphs have been provided by way of general introduction, and are not intended to limit the scope of the following claims. The described embodiments, together with further advantages, will be best understood by reference to the following detailed description taken in conjunction with the accompanying drawings.

In a first aspect, a method of determining user engagement in a video game is provided in accordance with claim 1.

In another aspect, a server adapted to determine user engagement in a video game is provided in accordance with claim 14.

In another aspect, an entertainment device adapted to determine user engagement in a video game is provided in accordance with claim 15.

Further respective aspects and features of the invention are defined in the appended claims.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DESCRIPTION OF THE EMBODIMENTS

A method and apparatus for determining user engagement in a videogame are disclosed. In the following description, a number of specific details are presented in order to provide a thorough understanding of the embodiments of the present invention. It will be apparent, however, to a person skilled in the art that these specific details need not be employed to practice the present invention. Conversely, specific details known to the person skilled in the art are omitted for the purposes of clarity where appropriate.

Figure 2:
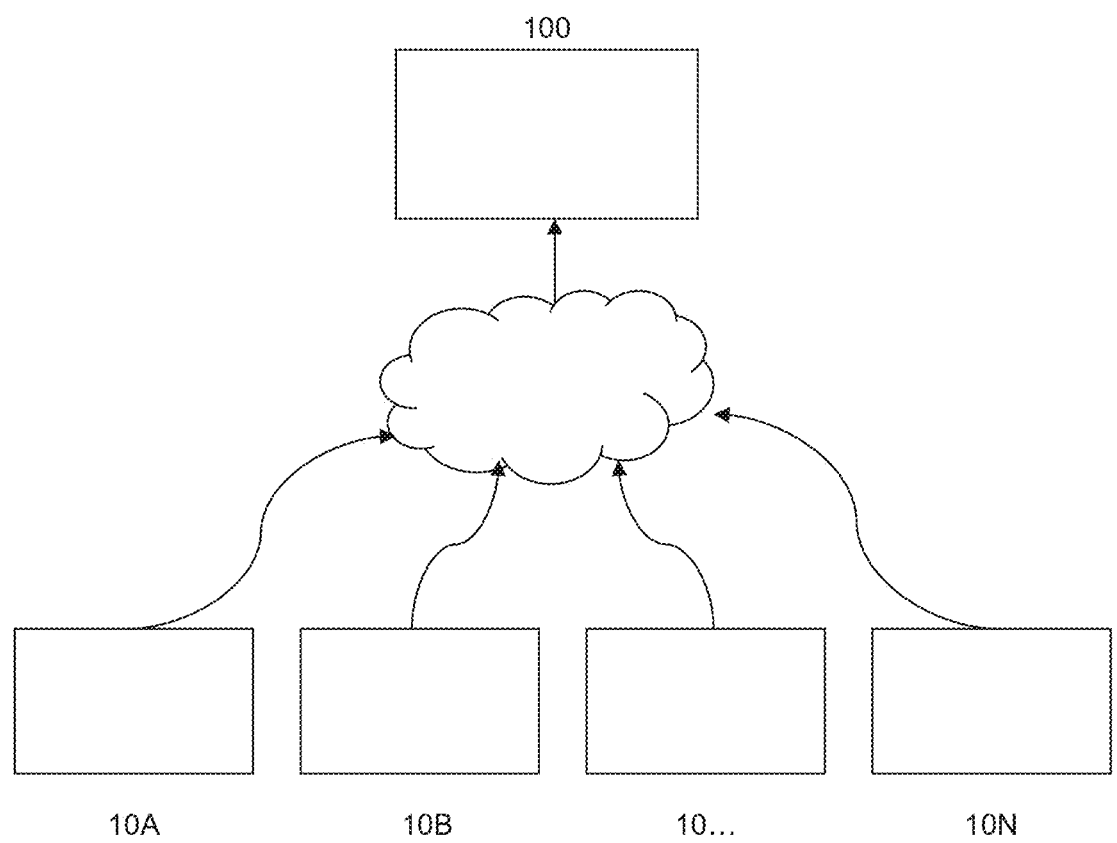
FIG. 2 is a schematic diagram of a system comprising a server in communication with one or more entertainment devices in accordance with embodiments of the present invention.
Figure 3:
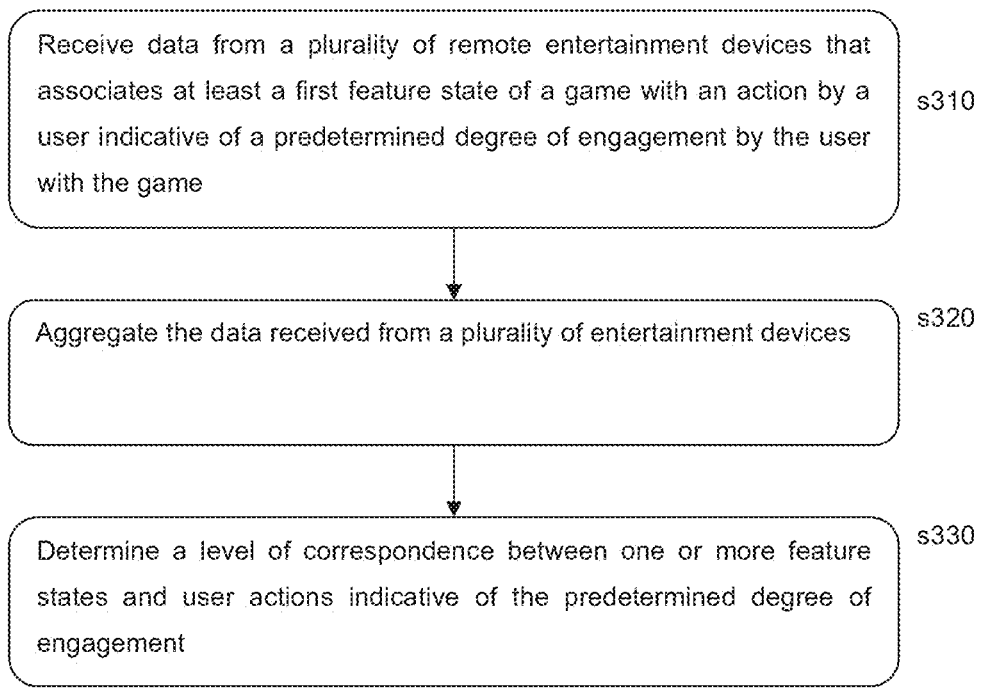
FIG. 3 is a flow diagram of a method of determining user engagement in a game, in accordance with embodiments of the present invention.

Referring now to the drawings, wherein like reference numerals designate identical or corresponding parts throughout the several views, then turning to FIGS. 2 and 3, a method of determining user engagement in the game comprises a first step s310 of receiving data from a plurality of remote entertainment devices (10A . . . N) at a server 100. As shown in FIG. 2, typically the server and remote entertainment devices are connected via a network such as a local area network or the Internet.

The data from a respective entertainment device associates a feature state of the game with an action by a user of that respective entertainment device indicative of a predetermined degree of engagement by the user with game. Hence for example the feature state of the game may be at least partially descriptive of the current state of the game as played by the user, whilst the action may be a user interaction with the game.

Figure 1:
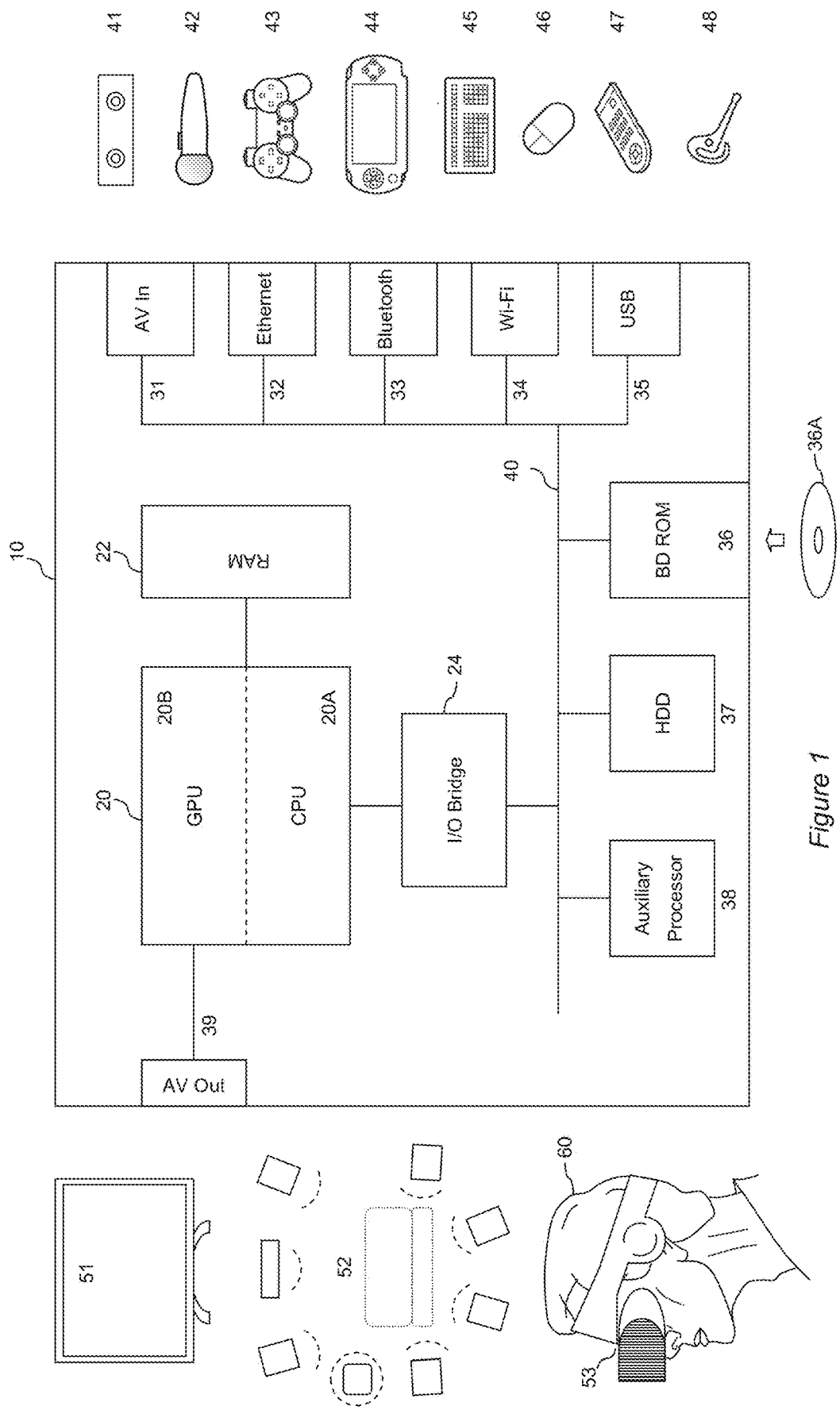
FIG. 1 is a schematic diagram of an entertainment device or server in accordance with embodiments of the present invention.

Referring now also to FIG. 1, to provide this data, the remote entertainment device comprises a processor (such as CPU 20A) adapted (for example under suitable software instruction) to monitor a feature state of the game. The device also comprises a processor adapted to detect user actions that are indicative of a predetermined degree of engagement by the user with the game (for example again CPU 20A operating under suitable software instruction); a processor adapted to associate a detected user action indicative of a predetermined degree of engagement by the user with the game with the monitored feature state (for example again CPU 20A operating under suitable software instruction); and a transmitter (for example an Ethernet® port32 or Wi-Fi® port 34) adapted to transmit data comprising the associated feature state and user action to a server adapted to determine user engagement in a game by evaluating the level of correspondence between feature states and user actions indicative of the predetermined degree of engagement.

The feature state is may be one or more of any suitable aspects of the game being played by the user. Typically for example the user's current location within the game environment may be included as part of the feature state. Other options include a location within the user's in-game field of view (for example at a predetermined distance from the user's current position indicative of the national region of interest); a currently active quest, where such quests are provided; a current non-player character companion, where such companion is present (for example either because they are currently bound to the player, or because they are within a predetermined radius of the player position); a current non-player character opponent, where such an opponent is present (again for example within the predetermined radius of the player position); and similarly any other suitable item that may be a potential source of interaction, such as a treasure chest, door, weapon or the like (again for example within the predetermined radius of the player position).

Another option may include the occurrence of an audio cue within the game; such a queue may be associated with any of the above locations, quests, events, non-player characters, or objects, or may relate to ambient noise within the game or the start, end or transition to or from a particular musical score.

Another option may include the occurrence of a visual cue within the game; again this may be associated with any of the above locations, quests, events, non-player characters, or objects, or may relate to the start and or transition of any of these, or ambient visual cues such as the apparent time of day or the apparent weather, or other visual cues such as tiredness, injury, or drunkenness being visually displayed by blurring or tinting of the displayed game, or altered visual states such as when wearing night-vision goggles, or playing a particular character class or game mode that affects the user's view.

Another option may include the appearance or present of a GUI, such as an inventory, a skill tree, a dialogue menu, an options menu or the like, which typically pauses gameplay whilst the user performs a function associated with the game, such as equipping inventory items, upgrading skills, choosing a dialogue response, or altering game options.

Any other suitable descriptor of the feature state may be considered to relate to engagement with a game, such as the user's current in-game health, wealth, character level, time played in the current game session, interaction with other players where present (for example via text or speech options), and the like.

As such, it will be understood that at a given moment in time the game may comprise a plurality of feature states, which individually may be thought of as contributing to the overall current state of the game, whether those feature states relate to location, active or passive object presence/interaction, audio or video cues, or game UI elements. Furthermore, over the course of the game, some of these feature states may change/evolve, while others may remain the same.

Returning to FIG. 3, a second step s320 comprises aggregating the data received from the plurality of entertainment devices.

Typically this comprises collecting user actions of a similar type and/or similarly feature states of a similar type. For example, locations within a threshold distance of each other may be aggregated, or locations may be aggregated according to predetermined 'regions' or 'tiles'. These regions may be uniform (e.g. or a grid) or may be population-based (e.g. per N received location values, where N may be any suitable number, but may be a statistically significant number for the purposes of determining a correspondence with one or more user actions).

Optionally this step may comprise mapping one or more feature states to a common representation or category, and/or mapping one or more user actions to a common representation or category.

It will be appreciated that, in an interactive game, some feature states are triggered by the game, whilst others are triggered by the user, and so different common representations may inherently imply more or less user causation, and hence have more or fewer parallels between common representations.

Hence feature states mapped to common representations may include for example the presence of any passive collectable item within a region of the user may be mapped to a single feature category, rather than distinguishing between consumables, weapons, treasure or the like, whilst the presence of any enemy within a predetermined distance of the player (or within the field of view) may be mapped to a single category of enemy features, and similarly the presence of any nonplayer character may be mapped to a single category of features.

Meanwhile similarly user actions may be mapped to common representations. Hence the act of collecting any passive collectable item may be mapped to a single category of action, rather than distinguishing between collecting consumables, weapons, treasure or the like, whilst choosing whether (or optionally whether not) to engage a nearby enemy may be mapped to a single action category of enemy engagement, and similarly entering into a dialogue with any non-player character may be mapped to a single action category of NPC engagement.

It will also be appreciated that multiple levels of common representation may abstract further away from the specific in-game instance. For example, the presence of any enemy or non-player character within a predetermined distance of the player (or within their field of view) may be mapped to a single feature category, whilst similarly any engagement with any enemy or non-player character, whether to fight or converse, may be mapped to a single user action category.

Hence it will be appreciated that single game feature or a user action may be associated with more than one common representation category, at different levels of abstraction.

Whether for game features, user actions or both, such use of common representations increases the rate at which a statistically significant number of commonly represented features or commonly represented actions of the same category can accumulate, for example within a given location or region of the game space.

With regards to locations or regions, it will be appreciated that the assignment of a location to a region comprising a plurality of locations, as described previously herein, is a spatial example of a common representation.

Other examples of common representation may include the display of, or accessing, any GUIs for objectives, journals, maps or any other GUIs related to navigation and questing; and the display of or accessing skill trees or GUIs for spending magic, experience, stamina, or health points and the like or any other GUIs related to character development, or the display of or accessing any GUIs related to weapons, clothing, food, crafting, trade and the like or any other GUIs related to resource management. Similarly the display of or accessing any GUI may be mapped to a single category action, and again such feature states or user actions may be associated with one or more categories at different levels of abstraction.

Other examples of common representation categories for feature states include mapping any instance of music to a soundtrack category, mapping ambient sounds to categories of source, such as environmental, NPC, user originating, event or quest driven, or the like, and/or according to amplitude, duration, primary frequency or the like.

Further examples of common representation categories for feature states may include mapping visual cues according to categories of source, such as environmental, NPC, user originating, event or quest driven, or the like, and/or according to brightness, duration, primary colour or the like.

Whether the feature state retains individual indicators of in-game features, or one or more levels of common representation, or any mix of these, and similarly whether the user actions retain individual indicators of those actions, or one or more levels of common representation, or any mix of these, then determining the level of correspondence between a user action and a respective feature state comprises evaluating the number of user actions associated with a respective feature state.

It will be appreciated that correspondences can be determined across different levels of abstraction. Hence for example a specific user action can be associated with a common representation of a feature state; for example one button may be used to access multiple GUIs and so the single action corresponding to that button press may be used to correspond to a common representation of the corresponding accessible GUIs. Similarly, actions by the user's character may be contextual, so that pressing the same button produces different actions according to who or what the action is directed at; these actions may all be categorised as a common representation (for example of 'attempted interaction'), but whilst for many situations such a common representation of general interaction may for example be evaluated against an equally common representation of 'passive objects' that might be interacted with. By contrast, for certain key characters or items in the game, this common representation of actions may be evaluated with respect to individual feature states or other/smaller/more selective common representations.

Referring again to FIG. 3, the third step s330 of the method relates to this evaluation of correspondence, and comprises determining a level of correspondence between one or more feature states and user actions indicative of the predetermined degree of engagement.

As noted above, correspondence can be between individual feature states or common representations thereof, and individual user actions or common representations thereof, or any combination of abstraction on either side.

Notably, this step comprises determining the level of correspondence in relation to user actions indicative of a predetermined degree of engagement.

Generally speaking some user actions (or categories of actions/common representations) are more likely to occur when a user is disengaged, lacks engagement or has low engagement with the game.

Similarly some user actions or categories of actions/common representations are more likely to occur when a user is highly engaged with the game.

By determining the level of correspondence between user actions indicative of low engagement and feature states of the game, one can determine which feature states have a strong correspondence with low user engagement.

Similarly by determining levels of correspondence between user actions indicative of high engagement and feature states of the game, one can determine which feature states have a strong correspondence with high user engagement.

User actions indicative of low engagement include, as non-exhaustive examples:

i. accessing an in-game menu; this may suggest that the user has broken immersion with the game world to perform in-game administration. This may also be dependent upon the particular menu selected; for example an inventory menu is less indicative of a lack of engagement than a game settings menu.

ii. accessing a fast-travel option; this may suggest that the user is disinterested in the current region of the game, or regions between the current region of the game and the fast-travel target. This may also be dependent upon context. For example, if the travel target is relevant to the currently active quest, then it may indicate engagement with that quest (and hence the game as a whole) whilst still being indicative of disinterest in the current area.

iii. looking away from the game for more than a predetermined period of time; where the remote entertainment device can receive a video image of the user (or track their gaze), then it may be possible to detect when they stop looking at the game, for example to check their phone or have a drink.

iv. saving the game; this may be indicative of the user thinking about quitting the game or anticipating that the next part of the game may be too hard.

v. pausing the game; like looking away, pausing the game may indicate that a wish to engage in a different activity has outweighed a wish to continue with the game, even if only temporarily. Equivalent to pausing, simply not providing user input and allowing the character to stand still is also indicative of disengagement, and further indicative of an expectation that nothing is going to interact with the in game character while they are not actively in control.

vi. dying within the game; whilst this is typically an involuntary action on the part of the player, it is usually a consequence of their actions or decisions, and forces an at least partial reset of the game. Repeating part of the game one or more times can reduce engagement with it, or make it feel like a chore. In this regards, dying repeatedly in the same area may also be indicative of frustration and a loss of immersion within the game.

vii. quitting the game; like pausing, this indicates that a wish to engage in a different activity outweighs a wish to continue with the game, or simply indicates a wish to discontinue the game. In either case, it is a significant indication of a lack of engagement. A further indicator may be the amount of time and/or distance between the last game save and quitting the game—if the two are close to each other, it indicates that the user is sufficiently engaged with the current state of the game to want to restart at that point, whilst if one or both is more than a threshold difference, it may indicate that the user has become disengaged with the current state of the game.

Hence it will be appreciated that some user actions may be indicative of a lack of user engagement, although in some contexts they may actually either be a neutral indicator or be suggestive of user engagement (or displaced engagement). This optional additional level of contextual analysis may require additional received data from the remote entertainment device, such as currently active quest, and any other game-specific status information relevant to the context(s) being sought. As noted from the examples above, frequency of in-game death, and spatiotemporal distance from a save point to a quitting point and the like are examples of additional data that may be collected.

Meanwhile, user actions indicative of high engagement include, as non-exhaustive examples:

i. combat; battling with other players or non-player characters is a typical indication of engagement as it is generally seen as either defending the well-being of the player's character or furthering their cause within the game.

ii. using directional inputs to move a character's position or viewpoint; exploring the local environment can be seen as indicative of engagement with an environment. Similarly, travelling towards a predefined map application (such as a town, quest marker, or other significant aspect of the in game environment) can be seen as purposeful behaviour.

iii. acquiring a collectable in-game object; collecting treasure resources and like can be seen as requiring observation and assessment of the object's worth with respect to the characters well-being, and can be generally seen as indicative of engagement with the game.

iv. completing a task set in the game; the completion of a task similarly suggests engagement with the game, as the user is following the game's instructions or hints, for example in the form of helping a non-player character, reaching a waypoint, and/or completing a quest or a predefined part thereof. Separately, the nature of the task may indicate whether the user is engaged with the current state of a main story arc or is either playing in a sandbox mode or grinding for resources; for example many larger open world games contain sub-games that enable the acquisition of resources, such as gambling or racing games; similarly many games comprise side quests that are not clearly related to the main story arc. Engagement with these may indicate that the user has reached a point in the main story arc that is no longer compelling to them, or that the users play of the game to this point has led them to a situation where they cannot easily progress without disengaging from the main story arc to meet a predefined requirement such as a skill level, amount of currency or the like.

v. accessing an in-game menu; as noted previously, depending on the menu that is being accessed and when it is being accessed, this may indicate engagement or disengagement.

vi. accessing a fast-travel option; again as noted previously, depending on the wider context of gameplay, this may indicate engagement with a quest and/or disengagement with the current area.

Hence again it will be appreciated that some user actions may be indicative of user engagement, although in some contexts they may actually either be a neutral indicator or be suggestive of a lack of user engagement. Again the optional additional level of contextual analysis that may be required to make this distinction in some cases may in turn require additional data from the remote entertainment device, such as the current quest, quest selection history, direction of travel, and the like.

One feature state of the game that may be of particular interest is the location within the game at which a user action is conducted.

As noted previously, the scale of an open world game in particular can make it difficult to populate with compelling content, and conversely including too much content can overwhelm the user.

A game developer may adopt strategies to determine sensible places to position content, such as close to routes between key locations on the map, and sometimes at the terminus of an environmental feature to reward exploration, so that engaging content is encountered at a reasonable pace throughout the game. Similarly within high-density regions of the map such as cities, where content cannot easily be isolated spatially and so can overwhelm the user, it may instead be separated temporally, for example by only enabling access to certain buildings at certain times, or enabling dialogue with certain characters once previous quests have been completed, or character levels have been achieved.

However, it is difficult to predict the user experience, due to the multiplicity of approaches and abilities of the potential user base.

Accordingly, some people may arrive at a city too early in the character's development, and be unable to access the city's content, or may choose to travel in unexpected directions during exploration of the world, for example due to wish for a complete experience of the game, or through misunderstanding their goals or cues in the environment.

Hence there is scope for users to become disengaged with the game due to an apparent lack of content or interaction arising either from unexpected behaviour on their part, or a need for the developer to further balance the spatial and social/temporal distribution of content within the game.

Accordingly, a heat map of actions associated with user disengagement may be generated for the developer, to help them understand where within the game users become disengaged (e.g. have low engagement and begin playing with certain UI features, saving the game, pausing the game, looking elsewhere, not providing game inputs, and the like). This can identify regions of the map which users find boring, confusing, or frustrating, so that the developers can target these for rebalancing of content.

Heat maps can be filtered for example according to character class, character level and the like, so that areas that may be engaging for melee class characters might be identified as less engaging for thief class characters or vice versa, and areas that are engaging for higher level characters might identified as less engaging for lower ones. These areas of the map may then be altered, for example adding more treasure to area that is less for a thief, or adding unlocked resource chests to an area disengaging for lower level characters, or alternatively resequencing one or more quests to discourage users from visiting that area until they have reached a higher character level.

Optionally, this modification process can be made automatic, at least for certain changes; for example a location (e.g. region) within the game environment associated with a low degree of engagement may be modified to incorporate a predetermined in-game feature associated with a high degree of engagement.

Hence a non-player character, enemy or treasure may be included within the location/region.

Optionally, this may be done on a probabilistic basis, with a probability of adding a feature dependent upon the lack of engagement indicated by the heat map, so that an area that has a high level of disengagement is more likely to be provided with a new in-game feature.

Typically the in-game feature is one that is not key to the game; hence for example the enemy may be an animal or other environmental hazard rather than a combative character from a particular faction or group relevant to the story.

Again, the heat map may be generated or filtered according to different character classes, levels or the like, and content relevant to the filtered criterion may be selected as illustrated previously.

Because character class and character level may depend upon user actions during the game, optionally these game features may be added during initialisation of gameplay, for example after an initial character selection process, and/or upon levelling up the character, and hence may be done by the remote entertainment device during execution of the game based upon heat map data gathered during alpha testing, beta testing, early access, or full release play.

Other criteria that affect gameplay, such as user demographics (for example younger players may be more likely to get bored and hence would respond well to a higher density of content) may be used, for example to increase the probability of content being added for a younger player.

As well as potentially adding game features associated with a high degree of engagement, optionally alternatively or in addition modification can comprise removing a predetermined in game feature associated with a low degree of engagement. For example, too many non-player characters in a location may become tiresome, particularly if they have a limited range of ambient dialogue. Either removing an NPC, or removing the option for them to speak, may actually improve engagement in these circumstances. Similarly if a forest is too dense, or fog or other weather effects impinge upon gameplay, it may be beneficial to reduce the number of trees, improve the transparency of the fog or make other such changes.

Again, this modification process can be made automatic, at least for certain changes, and so for example a location within the game environment associated with a low degree of engagement can be modified to remove a predetermined in-game feature associated with a low degree of engagement, as illustrated above.

The same approach can be used for regions with high engagement, where in fact the developers want the user to perform acts associated with low engagement.

For example, if a difficult opponent or environmental hazard is in an area where users are typically highly engaged, it may be that as a result they have not recently acted to save the game, or to upgrade equipment/skills.

As a result, the user might find it particularly frustrating to die and discover they have lost a comparatively large amount of progress. Accordingly, when a heat map indicates that a frequently fatal threat is found in an area of high engagement, optionally a feature associated with lower engagement may be placed nearby. For example, a guard or lesser threat may be added, encouraging a cautionary save, or an audio cue (such as music or an ambient effect) or visual cue (such as cloud cover or fog) may be added that temporarily causes the user to reflect on their status. It will be appreciated that lower engagement features need not be negative in the sense of invoking negative feelings in the player; for example providing a place to sit where a particular view of the game environment becomes possible may encourage the user to pause. Indeed, certain environmental features can be used to indicate to the player that a current location is quiet and safe. Such features may include audio cues such as music, a change in foliage, such as the presence of flowers, weather effects such as sun shine, or refuge locations such as campfires or the like.

Optionally, this modification process can be made automatic, at least for certain changes; for example a location within the game environment associated with a high degree of engagement may be modified to incorporate a predetermined in-game feature associated with a low or lower degree of engagement, as illustrated above. This may be done in response to the presence of one or more particular classes of threat in the same location or nearby.

Again, alternatively or in addition to including a lower-engagement feature, optionally a location within the game environment associated with a high degree of engagement may be modified to remove a predetermined in-game feature associated with a high degree of engagement. For example, where a heat map suggests that a large number of adjacent regions have a high level of engagement, it may be considered that this is the detriment of other areas and make the wider region of the game look unbalanced, or encourage user fatigue. Consequently in order to give the player some breathing space, features associated with higher engagement may be removed, such as reducing the number of non-quest related enemies (for example environmental enemies such as wild animals), reducing the number of collectable items, and the like.

Again optionally, this modification process can be made automatic, at least for certain changes; for example a location within the game environment associated with a high degree of engagement may be modified to a predetermined in-game feature associated with a high degree of engagement, as illustrated above. Again this may be done in response to the presence of one or more particular classes of threat in the same location or nearby.

When determining a level of correspondence between one or more feature states and user actions indicative of the predetermined degree of engagement (whether on an individual feature state or user action basis, or on the basis of a common representation of one or the other or both), this may be achieved by any suitable mechanism.

For example, to determine as correspondence between a location/region and user actions within that region, one or more histograms for use actions or common representations thereof may be provided for each region; subsequently one or more specific histograms, or a set of histograms corresponding to high or low user engagement can be added together, optionally after suitable weighting, to obtain a histogram value for each location/region and hence a heat map. It will also be appreciated that in this case the formation of the histogram a set of histograms may also be interpreted as aggregating the data from the multiple remote entertainment device sources.

More generally, the strength of correspondence, association, or correlation between user actions and feature states either individually or in a common representation category may be determined using any appropriate technique, such as relative frequency of association, absolute or relative number of associations or the like, or a more complex statistical models such as one or more of any of Markov models, Bayesian models or neural networks, which for example can be trained to predict the most likely user action in response to a feature state based upon observations from the aggregated data, and hence predict the most likely user action within the game based upon the feature states present.

It will be appreciated that the above methods may be carried out on conventional hardware suitably adapted as applicable by software instruction or by the inclusion or substitution of dedicated hardware.

Thus the required adaptation to existing parts of a conventional equivalent device may be implemented in the form of a computer program product comprising processor implementable instructions stored on a non-transitory machine-readable medium such as a floppy disk, optical disk, hard disk, PROM, RAM, flash memory or any combination of these or other storage media, or realised in hardware as an ASIC (application specific integrated circuit) or an FPGA (field programmable gate array) or other configurable circuit suitable to use in adapting the conventional equivalent device. Separately, such a computer program may be transmitted via data signals on a network such as an Ethernet, a wireless network, the Internet, or any combination of these or other networks.

As noted previously herein, a suitable remote entertainment device may be the Sony® PlayStation 4®.

Similarly, a server may be adapted to implement respective parts of the above techniques. The server may be a centralised server operating under suitable software instruction, or may itself be a Sony® PlayStation 4 ® or development kit operating in the role of server.

Hence in an embodiment of the present invention, server (100) adapted to determine user engagement in a game may comprise a receiver (such as Ethernet® port 32) adapted to receive data from a plurality of remote entertainment devices 10 at a server, the data from a respective entertainment device associating a feature state of the game (in other words at least partially descriptive of the current state of the game as played by the user) with an action by a user of that respective entertainment device indicative of a predetermined degree of engagement by the user with the game (for example, a user interaction with the game, as described previously herein); a processor (such as CPU 20A adapted by suitable software instruction) to aggregate the data received from the plurality of entertainment devices; and a processor (again such as CPU 20A adapted by suitable software instruction) to determine a level of correspondence between one or more feature states and user actions indicative of the predetermined degree of engagement.

Such a server may then provide this information to the developers, for example in the form of one or more heat maps and/or ranked game features associated with particularly high or low user engagement, in order to assist them with modifications to the game content.

Alternatively or in addition, the server may modify the game to increase or reduce user engagement as described previously herein, for example where the game is hosted on a central server.

Alternatively or in addition, the server may modify the game to increase or reduce user engagement as described previously herein, and distribute modification data to some or all of the remote entertainment devices indicating where to add or remove game features.

Alternatively or in addition, the server may provide the correspondence information to the remote entertainment devices, for example in the form of one or more heat maps and/or rent game features associated with particularly high or low user engagement, thereby enabling the remote entertainment devices to modify the game as described previously herein, for example on a probabilistic basis in at least some instances.

Optionally the server may be a logical component of the remote entertainment device, for example operating as a supervisory component of the videogame, and may use data only from the individual player of that game so as to determine over time a level of correspondence between one or more feature states and user interactions indicative of a predetermined degree of engagement, thereby creating an individually customised incarnation of the game in response to that user's interests, attention span and the like.

Similarly, for example to bootstrap such an approach, correspondence data for a wider corpus of users may be used initially, but then used in combination with data from the individual user as the number of user actions identified becomes statistically significant. For example a relative weighting between data from the corpus of players and data from the individual player may slowly shift from wholly or predominantly based on the corpus of players to wholly or predominantly based on the individual player.

Hence the remote entertainment device and the server may operate as a single system for determining user engagement in a game, either as a single unit, or as a networked system optionally in conjunction with other remote entertainment devices.

Finally, it will be appreciated that the apparatus techniques described herein are intended to characterise the relationship between user engagement and features of the game, and optionally to add or remove features that, through this characterisation are predicted to modify engagement in a desired manner. However, it will also be appreciated that this does not have any bearing on the scheme rule or method of playing a game, in the sense of defining winning or illegal moves of play or success or failure criteria; rather it relates to modifying the distribution of content within a game in order to better achieve a desired level of user engagement, given the game feature resources available.

The foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. A method of determining user engagement in a game, comprising the steps of:
   receiving data from a plurality of remote entertainment devices at a server, the data from a respective entertainment device associating at least a first feature state of the game with an action by a user of that respective entertainment device indicative of a predetermined degree of engagement by the user with the game;
   aggregating the data received from the plurality of entertainment devices; and
   determining a level of correspondence between one or more feature states and user actions indicative of the predetermined degree of engagement, wherein at least one of:
   (i) a location within a game environment associated with a low degree of engagement is modified either to incorporate a predetermined in-game feature associated with a high degree of engagement or to remove a predetermined in-game feature associated with a low degree of engagement; and
   (ii) a location within the game environment associated with a high degree of engagement is modified either to incorporate a predetermined in-game feature associated with a low degree of engagement or to remove a predetermined in-game feature associated with a high degree of engagement.

2. The method of claim 1, in which the feature state comprises one or more selected from the list consisting of:
   i. a location within the game environment;
   ii. the occurrence of an audio cue within the game;
   iii. the occurrence of a visual cue within the game; and
   iv. the appearance of a GUI.

3. The method of claim 1, in which the step of aggregating the received data comprises: mapping each respective user action to a common representation of one or more feature states responsive to the feature state associated with the respective user action.

4. The method of claim 3, in which the step of determining a level of correspondence with a respective feature state comprises: evaluating the number of user actions associated with a respective feature state within the common representation of the one or more feature states.

5. The method of claim 1, in which an action by the user of indicative of a low degree of engagement with the game comprises one or more selected from the list consisting of:
   i. accessing an in-game menu;
   ii. accessing a fast-travel option;

iii. looking away from the game for more than a predetermined period of time;
iv. saving the game;
v. pausing the game;
vi. dying within the game; and
vii. quitting the game.

6. The method of claim 1, in which an action by the user indicative of a high degree of engagement with the game comprises one or more selected from the list consisting of:
i. combat;
ii. using directional inputs to move a character's position or viewpoint;
iii. acquiring a collectable in-game object;
iv. completing a task set in the game;
v. accessing an in-game menu; and
vi. accessing a fast-travel option.

7. A non-transitory, computer readable medium having computer executable instructions stored thereon, which when executed by a computer system, causes the computer system to determine user engagement in a game by carrying out actions, comprising:
receiving data from a plurality of remote entertainment devices at a server, the data from a respective entertainment device associating at least a first feature state of the game with an action by a user of that respective entertainment device indicative of a predetermined degree of engagement by the user with the game;
aggregating the data received from the plurality of entertainment devices; and
determining a level of correspondence between one or more feature states and user actions indicative of the predetermined degree of engagement, wherein at least one of:
(i) a location within a game environment associated with a low degree of engagement is modified either to incorporate a predetermined in-game feature associated with a high degree of engagement or to remove a predetermined in-game feature associated with a low degree of engagement; and
(ii) a location within the game environment associated with a high degree of engagement is modified either to incorporate a predetermined in-game feature associated with a low degree of engagement or to remove a predetermined in-game feature associated with a high degree of engagement.

8. A server adapted to determine user engagement in a game comprises:
a receiver adapted to receive data from a plurality of remote entertainment devices at a server, the data from a respective entertainment device associating a feature state of the game with an action by a user of that respective entertainment device indicative of a predetermined degree of engagement by the user with the game;
a processor adapted to aggregate the data received from the plurality of entertainment devices; and
a processor adapted to determine a level of correspondence between one or more feature states and user actions indicative of the predetermined degree of engagement, wherein at least one of:
(i) a location within a game environment associated with a low degree of engagement is modified either to incorporate a predetermined in-game feature associated with a high degree of engagement or to remove a predetermined in-game feature associated with a low degree of engagement; and
(ii) a location within the game environment associated with a high degree of engagement is modified either to incorporate a predetermined in-game feature associated with a low degree of engagement or to remove a predetermined in-game feature associated with a high degree of engagement.

9. An entertainment device adapted to determine user engagement in a game comprises:
a processor adapted to monitor a feature state of the game;
a processor adapted to detect user actions that are indicative of a predetermined degree of engagement by the user with the game;
a processor adapted to associate a detected user action indicative of a predetermined degree of engagement by the user with the game with the monitored feature state; and
a transmitter adapted to transmit data comprising the associated feature state and user action to a server adapted to determine user engagement in a game by evaluating the level of correspondence between feature states and user actions indicative of the predetermined degree of engagement, wherein at least one of:
(i) a location within a game environment associated with a low degree of engagement is modified either to incorporate a predetermined in-game feature associated with a high degree of engagement or to remove a predetermined in-game feature associated with a low degree of engagement; and
(ii) a location within the game environment associated with a high degree of engagement is modified either to incorporate a predetermined in-game feature associated with a low degree of engagement or to remove a predetermined in-game feature associated with a high degree of engagement.

* * * * *